United States Patent
Tjernström

[11] Patent Number: 5,944,457
[45] Date of Patent: Aug. 31, 1999

[54] TOOLHOLDER FOR INDEXABLE INSERTS

[75] Inventor: Eric Tjernström, Gävle, Sweden

[73] Assignee: Sandvik Aktiebolag, Sandviken, Sweden

[21] Appl. No.: 08/987,613

[22] Filed: Dec. 9, 1997

[30] Foreign Application Priority Data

Dec. 9, 1996 [SE] Sweden .................................. 9604526

[51] Int. Cl.$^6$ .................................................. B23B 27/16
[52] U.S. Cl. .......................... 407/105; 407/107; 407/111
[58] Field of Search .................................. 407/105, 104, 407/102, 103, 107, 111

[56] References Cited

U.S. PATENT DOCUMENTS

| | | |
|---|---|---|
| 3,314,126 | 4/1967 | Stier . |
| 5,035,544 | 7/1991 | Ikenaga et al. .......................... 407/105 |
| 5,100,268 | 3/1992 | Nakayama et al. ...................... 407/104 |
| 5,586,844 | 12/1996 | Nyman ..................................... 407/105 |

FOREIGN PATENT DOCUMENTS 001565593  5/1990  U.S.S.R. ................. 407/103

Primary Examiner—Andrea L. Pitts
Assistant Examiner—Henry W. H. Tsai
Attorney, Agent, or Firm—Burns, Doane, Swecker & Mathis, L.L.P.

[57] ABSTRACT

A toolholder forms a seat in which a cutting insert is seated. The insert is held in place by a clamp having front and rear portions. The front portion engages within a center hole of the insert, and the rear portion engages an inclined surface of the toolholder so that the clamp is pushed downwardly and rearwardly when attached by a screw. A coil spring surrounds the screw and is compressed between the clamp and the toolholder to bias the clamp upwardly. An upper end of the spring is disposed in a bore of the clamp which is inclined relative to the screw, whereby the spring abuts a rear portion of a wall of the bore to bias the clamp rearwardly as well as upwardly.

23 Claims, 1 Drawing Sheet 5,944,457

TOOLHOLDER FOR INDEXABLE INSERTS

BACKGROUND OF THE INVENTION

The present invention relates to a toolholder for centrally apertured indexable inserts intended for chipforming machining of metallic workpieces.

Indexable inserts are usually provided with nose point angles below 60° and they are usually intended for copying machining. There exist a variety of toolholders for various types of indexable inserts with nose point angles of 55° such as rhombic, rhomboidic and triangular inserts with equal angles all around the insert. The material used for such inserts is normally cemented carbide material or ceramic material. Other indexable inserts include round cutting edges.

A commonly used locking system for indexable inserts includes a pin in the holder extending upwardly into the insert-receiving pocket to engage a hole in the insert located in the pocket, and means for forcing the pin to be subjected to a pivoting movement inwardly or rearwardly towards the holder. The forcing means is arranged to actuate the lower portion of the pin, thus urging both the pin and the insert rearwards towards a wall formed in the insert receiving pocket. Such type of toolholder is disclosed in U.S. Pat. No. 3,314,126. The drawback of such holder, however, is that the forward nose portion of the cutting insert has a tendency to lift off a supporting shim plate upon which it rests, which can lead to insert failure.

In view thereof it is desirable to provide a toolholder with a press device which will ensure that the insert is pushed both downwardly and rearwardly and clamp forces will keep the insert firmly and safely in place in its location without any tendency of the insert to lift off its underlying supporting surface.

SUMMARY OF THE INVENTION

The present invention involves an apparatus adapted to clamp an indexable insert, comprising a toolholder presenting an insert pocket configured to receive an indexable insert. The pocket includes upstanding surfaces against which an indexable insert can be rearwardly clamped. The toolholder includes a threaded hole located rearwardly of the pocket. A clamp is mounted on the toolholder. The clamp includes a forward end adapted to engage an insert, and a rear portion engaging a portion of the toolholder, the clamp including a bore extending therethrough adjacent the rear portion. A clamp screw extends through the bore and is threaded into the threaded hole, for urging the clamp against the toolholder. A coil spring surrounds the clamp screw and is compressed between the clamp and the toolholder to bias the clamp away from the toolholder. An end of the coil spring extends into the bore. The bore is inclined obliquely with respect to a central axis of the screw such that the end of the spring pushes against a rear portion of a wall of the bore to apply a rearward force to the clamp.

BRIEF DESCRIPTION OF THE DRAWING

The invention will now be described more in detail by reference to the enclosed drawings which illustrate a preferred embodiment of the invention.

DETAILED DESCRIPTION OF A PREFERRED EMBODIMENT OF THE INVENTION

Figure 1:
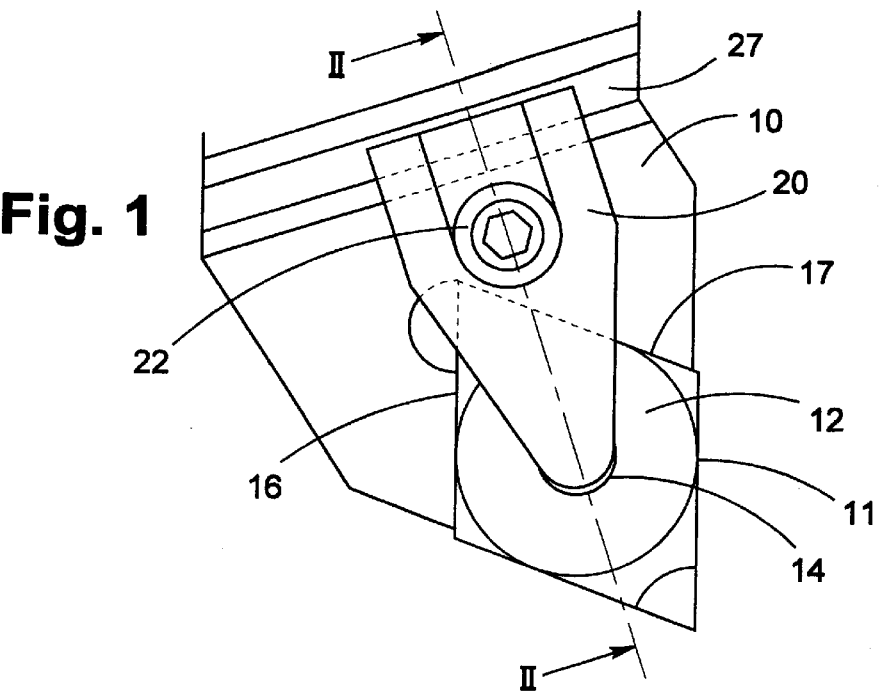
FIG. 1 is a top view of a toolholder according to the invention.
Figure 2:
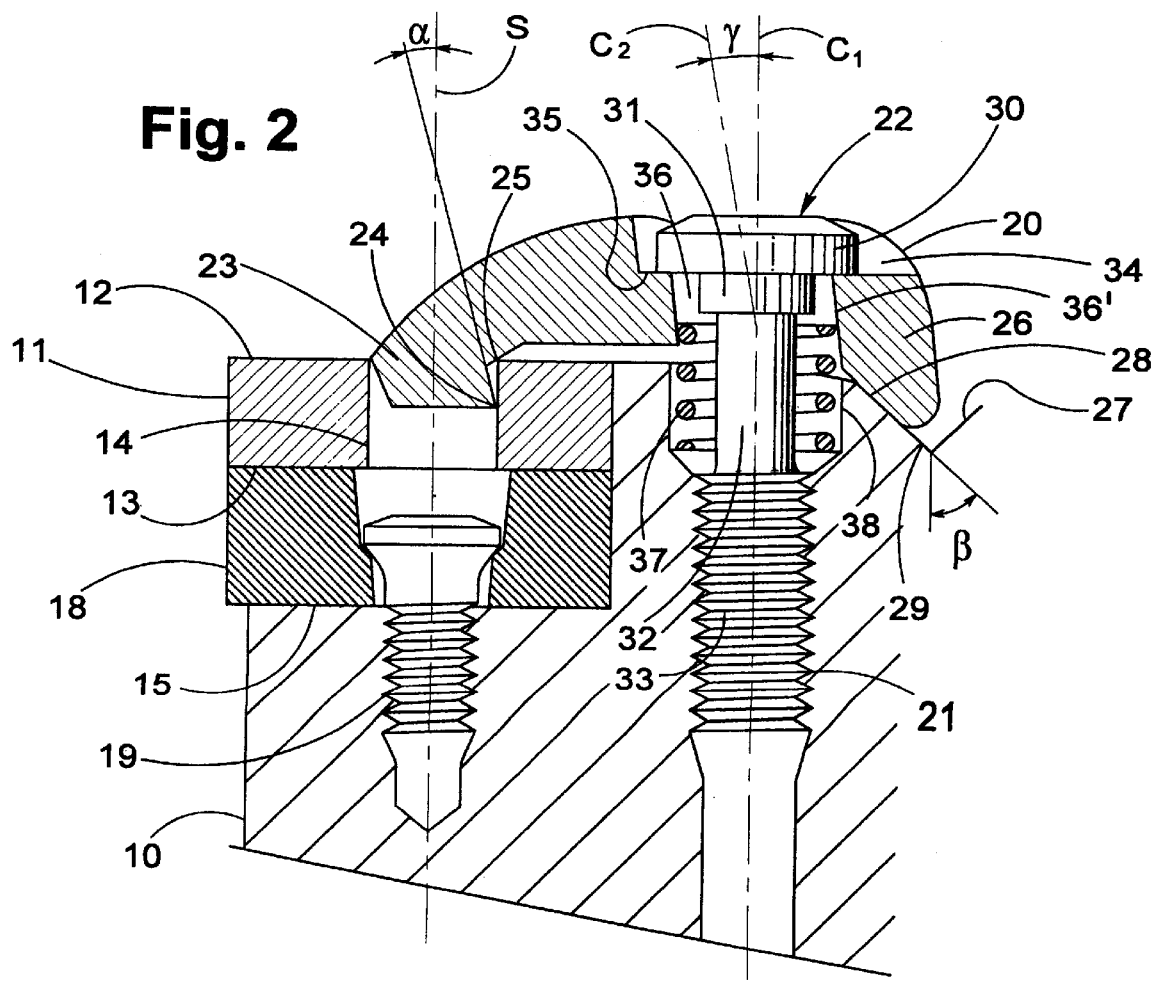
FIG. 2 is a sectional view taken along the line II—II of the toolholder shown in FIG. 1.

In FIGS. 1–2 there is shown a cutting tool comprising a toolholder 10 the forward nose portion of which is provided with a pocket for the receipt of an indexable cutting insert 11. This insert has a rhombic basic shape with nose point angles less than 60°. The insert has an upper flat surface 12, a lower flat surface 13 parallel with the upper surface, and perpendicularly extending side walls therebetween. The insert 11 has a central hole 14, the central axis of which is extending perpendicularly towards upper and lower flat surfaces 12, 13. The insert receiving pocket comprises a bottom supporting surface 15 and two side support surfaces 16, 17 upstanding perpendicularly therefrom. The bottom supporting surface 15 could either be a surface portion of the holder 10 itself or be provided as a separate shim plate 18 in the insert-receiving pocket, the shim plate being secured to the holder by a screw 19 having a central axis S.

There is a clamp 20 provided for the clamping of the insert into its pocket in the holder 10, the clamp being actuatable by means of a clamp screw 22 that extends entirely through the clamp and threadably engages a bore 21 in the holder 10. The central axis $C_1$ of the screw extends parallel with the central axis of the hole 14 in the insert. The forward end of the clamp is in the shape of a downwards-inwards inclined first protrusion 23 having an axis of symmetry inclined at an angle α in relation to the axis S, and intended to engage with a rearwardmost portion of a wall of the hole 14, i.e., a portion of that wall located farthest from the effective cutting point of the insert. The protrusion 23 engages the wall with a contact point 24 at a distance downwardly into the hole of the insert. At the same time, an under surface of the clamp 20 abuts against the upper insert surface 12 at a contact surface 25 adjacent to the central hole 14 of the insert. The opposite end of the clamp is in the shape of a second protrusion 26 that is received in a recess 27 in the holder 10. The end surface 28 of a protrusion 26 is in the form of a flat surface for making surface abutment with a corresponding planar contact surface 29 in the recess 27 that is inclined at an angle β in relation to the central axis $C_1$ of the clamp screw 22. Alternatively, the end surface 28 could be convex rather than flat. The size of that angle (α) should be essentially of the same size or somewhat smaller than the acute angle β.

The clamp screw 22 has an upper flange-formed head portion 30 integral with an adjacent smaller-diameter cylindrical portion 31. The portion 31 is integral with a cylindrically shaped waist portion 32 having a smaller diameter than the cylindrical portion 31. The waist portion 32 extends into a lower threaded portion 33 the diameter of which is larger than the diameter of the waist portion 32. Upon tightening, the top surface of the head 30 of the screw becomes essentially flush with the surrounding upper surface of the clamp 20 at the same time as the screw is received in a recess 34 in the clamp such that the underside of the screw head abuts against a corresponding radially extending surface 35 in the clamp 20.

In accordance with the invention the toolholder is provided with a coil spring 37 mounted around the upper portion of the clamp screw 22, so that the clamp is pressed upwards upon a loosening of the screw 20. The spring 37 extends axially along the cylindrical waist portion 32, and an upper portion thereof is received in an inclined bore 36 of the clamp 20. A lower portion of the spring is received in a cylindrical recess 38 of the toolholder. More specifically, the central axis $C_2$ of a bore 36 extends at an acute angle γ in relation to the central axis $C_1$ of the screw 22 (which coincides with the axis of the screw-receiving bore 21). In accordance with a suitable embodiment, the size of the angle γ is about the same as the selected size of the angle α, preferably in the range of 2–15°. The bore is inclined downwardly and rearwardly. As appears from FIG. 2 both the upper cylindrical portion 31 of the screw, as well as the upper portion of a coil spring 37, are received in the inclined bore 36, the arrangement being such that there is a certain radial play between a cylindrical portion 31 and the wall of the inclined bore 36. On the other hand, the upper portion of the coil spring 37 is brought into surface contact with a rear portion 36' of the wall of the bore 36. Since the bore 36 is inclined, it is ensured that the clamp 20 and the insert 11, upon a tightening of the screw 22, are urged rearwards towards the toolholder, thus establishing a firm and efficient clamping of the insert into its pocket in the toolholder 10.

That is, since the spring is compressed, it will apply an upwardly directed force to the wall of the hole 36. Since the spring abuts the rear portion 36' of the hole 36 which is inclined downwardly and rearwardly, the spring will apply to that rear portion 36' an upward force having a rearwardly directed component (i.e., directed to the right in FIG. 2) to apply a corresponding rearwardly directed force to the insert (via the projection 23) for effectively clamping the insert rearwardly against the support surfaces 16, 17. Further, due to the arrangement of the head of the screw 22 in a recess of the clamp it becomes possible to eliminate or reduce the risk of chips coming into intimate contact with the clamp body and avoids excessive wear thereof. The coil spring 37 is also partially received in a countersunk cylindrical recess 38 of the toolholder, the central axis of which coincides with axis $C_1$. The recess 38 merges with the threaded bore 21 in which the threaded portion 33 of the clamp screw 22 is received. The longitudinal extent of the recess 38 is substantially the same as the thickness of the insert 11. The rearmost located portion of the wall of the spring-receiving bore 36 has a longer extent axially than the diametrically opposite forwardmost portion of the wall of the bore 36. This ensures a more clear lateral guidance of the coil spring against the rear portion of the wall of the bore 36 so that a more efficient rearwardly directed clamping of the insert is accomplished. Due to providing the inclined angle α, the clamp is urged to move rearwardly straight towards the holder, and engage the insert at point 24, for urging the insert into its final position. The clamp thereby secures the insert 11 both vertically and horizontally. Due to providing a wedging action, as a result of the angle α, the horizontally acting force will be substantial.

Although the invention is described above in connection with a polygonally shaped indexable insert with a nose point angle below 60°, it is to be understood that the invention could be similarly used for clamping inserts of other configurations, such as round inserts.

What is claimed is:

1. Apparatus adapted to clamp an indexable insert, comprising:
   a toolholder presenting an insert pocket configured to receive an indexable insert, the pocket including upstanding surfaces against which an indexable insert can be rearwardly clamped, the toolholder including a threaded hole located rearwardly of the pocket;
   a clamp mounted on the toolholder, the clamp including a forward end adapted to engage an insert, and a rear portion engaging a portion of the toolholder, the clamp including a bore extending therethrough adjacent the rear portion;
   a clamp screw extending through the bore and being threaded into the threaded hole, for urging the clamp against the toolholder; and
   a coil spring surrounding the clamp screw and compressed between the clamp and the toolholder to bias the clamp away from the toolholder, an end of the coil spring extending into the bore;
   the bore being inclined obliquely with respect to a central axis of the screw such that the spring is compressed by a rear portion of an obliquely inclined wall of the bore, whereby the end of the spring pushes against that rear portion to apply a force to the clamp having a rearwardly directed component.

2. The apparatus according to claim 1 wherein the portion of the toolholder engaged by the rear portion of the clamp is inclined at an oblique angle relative to the screw for applying a rearward force to the clamp.

3. The apparatus according to claim 1 wherein the clamp has an upper surface and a recess formed therein, the recess including a shoulder extending perpendicular to the screw; the screw including a head bearing against the shoulder, and an upper surface oriented substantially flush with the upper surface of the clamp.

4. The apparatus according to claim 1 wherein the toolholder includes a cylindrical recess coaxial with and connected to the threaded hole; the cylindrical recess being of larger diameter than the threaded hole; another end of the spring being seated in the cylindrical recess.

5. The apparatus according to claim 1 wherein the rear portion of the wall of the bore is longer than a front portion of the wall of the bore.

6. The apparatus according to claim 1 wherein the bore forms an angle with the central axis of the screw; the forward end of the clamp being inclined rearwardly at the same angle with respect to the central axis.

7. The apparatus according to claim 6 wherein the angle is from 2 to 15°.

8. The apparatus according to claim 1, further in combination with an indexable insert seated in the pocket, the insert including a center hole having a wall engaged by the forward end of the clamp, the center hole having an axis oriented parallel to the central axis of the screw.

9. The apparatus according to claim 1, further in combination with an indexable insert seated in the pocket, the insert including a center hole having a wall engaged by the forward end of the clamp.

10. The apparatus according to claim 9 wherein the clamp includes an undersurface disposed between the forward end and rear portion thereof; the undersurface pressing against a top surface of the insert.

11. The apparatus according to claim 10 wherein the wall of the center hole intersects the top surface of the insert to form therewith an edge; the undersurface being inclined obliquely with respect to an axis of the center hole and engaging the edge.

12. The apparatus according to claim 10 wherein the forward end of the clamp makes point contact with the wall of the center hole at a location spaced from the top surface of the insert.

13. The apparatus according to claim 9 wherein the toolholder includes a cylindrical recess coaxial with and connected to the threaded hole of the clamp; the cylindrical recess being of larger diameter than the threaded hole; another end of the spring being seated in the cylindrical recess; an axial length of the cylindrical recess being substantially equal to a thickness of the insert.

14. The apparatus according to claim 9 wherein the forward end of the clamp is inclined downwardly and rearwardly at a first acute angle with respect to the central axis of the central hole of the insert; the portion of the toolholder engaged by the rear portion of the clamp being inclined downwardly and rearwardly at a second acute angle with respect to the central axis of the unit; the first acute angle being no greater than the second acute angle.

15. The apparatus according to claim 14 wherein the first and second angles are substantially equal.

16. The apparatus according to claim 14 wherein the first acute angle is from 2 to 15°.

17. Apparatus adapted to clamp an indexable insert, comprising:

a toolholder presenting an insert pocket configured to receive an indexable insert, the pocket including upstanding surfaces against which an indexable insert can be rearwardly clamped, the toolholder including a threaded hole located rearwardly of the pocket;

a clamp mounted on the toolholder, the clamp including a forward end adapted to engage an insert, and a rear portion engaging a portion of the toolholder, the clamp including a bore extending therethrough adjacent the rear portion;

a clamp screw extending through the bore and being threaded into the threaded hole, for urging the clamp against the toolholder; and a coil spring surrounding the clamp screw and compressed between the clamp and the toolholder to bias the clamp away from the toolholder, an end of the coil spring extending into the bore;

the bore being inclined obliquely with respect to a central axis of the screw such that the end of the spring pushes against a rear portion of a wall of the bore to apply a rearward force to the clamp;

wherein the clamp has an upper surface and a recess formed therein, the recess including a shoulder extending perpendicular to the screw; the screw including a head bearing against the shoulder, and an upper surface oriented substantially flush with the upper surface of the clamp.

18. Apparatus adapted to clamp an indexable insert, comprising:

a toolholder presenting an insert pocket configured to receive an indexable insert, the pocket including upstanding surfaces against which an indexable insert can be rearwardly clamped, the toolholder including a threaded hole located rearwardly of the pocket;

a clamp mounted on the toolholder, the clamp including a forward end adapted to engage an insert, and a rear portion engaging a portion of the toolholder, the clamp including a bore extending therethrough adjacent the rear portion;

a clamp screw extending through the bore and being threaded into the threaded hole, for urging the clamp against the toolholder; and a coil spring surrounding the clamp screw and compressed between the clamp and the toolholder to bias the clamp away from the toolholder, an end of the coil spring extending into the bore;

the bore being inclined obliquely with respect to a central axis of the screw such that the end of the spring pushes against a rear portion of a wall of the bore to apply a rearward force to the clamp, wherein the rear portion of the wall of the bore being longer than a front portion of the wall of the bore.

19. Apparatus adapted to clamp an indexable insert, comprising:

a toolholder presenting an insert pocket configured to receive an indexable insert, the pocket including upstanding surfaces against which an indexable insert can be rearwardly clamped, the toolholder including a threaded hole located rearwardly of the pocket;

a clamp mounted on the toolholder, the clamp including a forward end adapted to engage an insert, and a rear portion engaging a portion of the toolholder, the clamp including a bore extending therethrough adjacent the rear portion;

a clamp screw extending through the bore and being threaded into the threaded hole, for urging the clamp against the toolholder; and a coil spring surrounding the clamp screw and compressed between the clamp and the toolholder to bias the clamp away from the toolholder, an end of the coil spring extending into the bore;

the bore being inclined obliquely with respect to a central axis of the screw such that the end of the spring pushes against a rear portion of a wall of the bore to apply a rearward force to the clamp, wherein the bore forms an angle with the central axis of the screw; the forward end of the clamp being inclined rearwardly at the same angle with respect to the central axis.

20. Apparatus adapted to clamp an indexable insert, comprising:

an indexable insert including a center hole;

a toolholder presenting an insert pocket in which the indexable insert is seated, the pocket including upstanding surfaces against which the indexable insert is rearwardly clamped, the toolholder including a threaded hole located rearwardly of the pocket;

a clamp mounted on the toolholder, the clamp including a forward end inclined downwardly and rearwardly at a first acute angle with respect to the central axis of the central hole of the insert, the forward end engaging a wall of the center hole of the insert, and a rear portion engaging a portion of the toolholder which is inclined downwardly and rearwardly at a second acute angle with respect to the central axis of the central hole, the first acute angle being no greater than the second acute angle, the clamp further including a bore extending therethrough adjacent the rear portion;

a clamp screw extending through the bore and being threaded into the threaded hole, for urging the clamp against the toolholder; and a coil spring surrounding the clamp screw and compressed between the clamp and the toolholder to bias the clamp away from the toolholder, an end of the coil spring extending into the bore;

the bore being inclined obliquely with respect to a central axis of the screw such that the end of the spring pushes against a rear portion of a wall of the bore to apply a rearward force to the clamp.

21. Apparatus adapted to clamp an indexable insert, comprising:

an indexable insert including a center hole;

a toolholder presenting an insert pocket in which the indexable insert is seated, the pocket including upstanding surfaces against which the indexable insert is rearwardly clamped, the toolholder including a threaded hole located rearwardly of the pocket;

a clamp mounted on the toolholder, the clamp including a forward end engaging a wall of the center hole of the insert, a rear portion engaging a portion of the toolholder, and an undersurface disposed between the forward end and the rear portion, the undersurface pressing downwardly against a top of the insert; the clamp including a bore extending therethrough adjacent the rear portion;

a clamp screw extending through the bore and being threaded into the threaded hole, for urging the clamp against the toolholder; and a coil spring surrounding the clamp screw and compressed between the clamp and the toolholder to bias the clamp away from the toolholder, an end of the coil spring extending into the bore.

22. The apparatus according to claim 21, wherein the bore is inclined obliquely with respect to a central axis of the screw such that the end of the spring pushes against a rear portion of a wall of the bore to apply a rearward force to the clamp.

23. The apparatus according to claim 22, wherein the undersurface is inclined with respect to an upper surface of the insert, whereby the undersurface engages an edge defined by an intersection of the insert upper surface and the wall of the center hole.

* * * * *